(12) United States Patent
Zhang et al.

(10) Patent No.: US 7,689,954 B2
(45) Date of Patent: Mar. 30, 2010

(54) EFFICIENT STATISTICAL TIMING ANALYSIS OF CIRCUITS

(75) Inventors: Lizheng Zhang, Madison, WI (US); Yuhen Hu, Middleton, WI (US); Chun-ping Chen, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 591 days.

(21) Appl. No.: 11/420,322

(22) Filed: May 25, 2006

(65) Prior Publication Data

US 2007/0277134 A1 Nov. 29, 2007

(51) Int. Cl.
*G06F 17/50* (2006.01)
(52) U.S. Cl. .......................................................... 716/6
(58) Field of Classification Search ........................ None
See application file for complete search history.

(56) References Cited

OTHER PUBLICATIONS

Agarwal et al., "Statistical Delay Computation Considering Spatial Correlations," Proceedings of the ASP-DAC 2003, Jan. 21-24, 2003, pp. 271-276.*
Agarwal et al., "Statistical Timing Analysis Using Bounds and Selective Enumeration," IEEE Trans. on CAD of ICs and Systems, vol. 22, No. 9, Sep. 2003, pp. 1243-1260.*
Agarwal et al., "Statistical Timing Analysis for Intra-Die Process Variations with Spatial Correlations," ICCAD 2003, pp. 900-907.*
Bhardwaj et al., "tAU: Timing Analysis Under Uncertainty," ICCAD 2003, pp. 615-620.*
Chang et al., "Statistical Timing Analysis Considering Spatial Correlations Using a Single Pert-like Traversal," ICCAD 2003, pp. 621-625.*
Clark, Operations Research, The Greatest of Finite Set of Random Variables, Mar.-Apr. 1961, pp. 145-162.*
Devgan et al., "Block-based Static Timing Analysis with Uncertainty," ICCAD 2003, pp. 607-614.*
Li et al., "Asymptotic Probability Extraction for Non-Normal Distributions of Circuit Performance," 2004 IEEE, pp. 2-9.*
Liou et al., "False-Path-Aware Statistical Timing Analysis and Efficient Path Selection for Delay Testing and Timing Validation," DAC 2002, pp. 566-569.*
Nassif, "Within-Chip Variability Analysis," 1998 IEEE, pp. 11.1.1-11.1.4.*
Nassif, "Modeling and Analysis of Manufacturing Variations," IEEE 2001 Custom ICs Conferemce, pp. 223-228.*

(Continued)

*Primary Examiner*—Leigh Marie Garbowski
(74) *Attorney, Agent, or Firm*—Boyle Fredrickson, S.C.

(57) ABSTRACT

Statistical timing analysis methods for circuits are described which compensate for circuit elements having correlated timing delays with a high degree of computational efficiency. An quadratic timing model is used to represent each delay element along a circuit path, wherein each element's delay has a first-order relationship to local variations and a second-order relationship to global variations. Propagation of the modeled delays through the circuit is efficiently done via straightforward ADD operations where an input propagates through another element in a circuit path, and via a MAX operation (or an approximation thereof) where two or more inputs merge at an intersection. The inputs to the MAX operator can be tested for gaussianity, and can be processed by the MAX operation (or its approximation) if they are substantially gaussian. Otherwise, they may be stored in a tuple for processing at later points along the circuit path.

20 Claims, 7 Drawing Sheets

OTHER PUBLICATIONS

Orshansky et al., "Fast Statistical Timing Analysis Handling Arbitrary Delay Correlations," DAC 2004, pp. 337-342.*

Orshansky et al., "A General Probabilistic Framework for Worst Case Timing Analysis," DAC 2002, pp. 556-561.*

Tsukiyama et al., "A Statistical Static Timing Analysis Considering Correlations Between Delays," 2001 IEEE, pp. 353-358.*

Visweswariah et al., "First-Order Parameterized Block-Based Statistical Timing Analysis," TAU '04, Feb. 2004, pp. 1-8.*

Wang et al., "DRAGON2000: Standard-Cell Placement Tool for Large Industry Circuits," 2000 IEEE, pp. 260-263.*

Zhang et al., "Correlation-Preserved Non-Gaussian Statistical Timing Analysis with Quadratic Timing Model," DAC 2005, pp. 83-88.*

Zhang et al., "Statistical Timing Analysis with Extended Pseudo-Canonical Timing Model," Date 2005, 6 pages.*

Zhang et al., "Correlation-Preserved Statistical Timing With a Quadratic Form of Gaussian Variables," IEEE Trans. on CAD of ICs and Systems, vol. 25, No. 11, Nov. 2006, pp. 2437-2449.*

Zhang et al., "Statistical Timing Analysis with Path Reconvergence and Spatial Correlations," Design, Automation and Test in Europe, Mar. 2006, 5 pages.*

* cited by examiner (a) c.d.f. of Inverter Delay (b) p.d.f. of Inverter Delay (a) c.d.f. from Three Methods (b) p.d.f. from Three Methods (b) c.d.f. of ISCAS c3540

(a) p.d.f. of ISCAS c3540

EFFICIENT STATISTICAL TIMING ANALYSIS OF CIRCUITS

STATEMENT REGARDING FEDERALLY SPONSORED RESEARCH

This invention was made with United States government support awarded by the following agencies:
National Science Foundation (NSF) Grant No(s).: 0093309

The United States has certain rights in this invention.

FIELD OF THE INVENTION

This document concerns an invention relating generally to statistical timing analysis of integrated circuits.

BACKGROUND OF THE INVENTION

For integrated circuits (e.g., VLSI chips) to work properly, the signals traveling along their gates and interconnects must be properly timed, and several factors are known to cause timing variations. As examples, variations in manufacturing process parameters (such as variations in interconnect diameter, gate quality, etc.) can cause timing parameters to deviate from their designed value. In low-power applications, lower supply voltages can cause increased susceptibility to noise and increased timing variations. Densely integrated elements and non-ideal on-chip power dissipation can cause "hot spots" on a chip, which can also cause excessive timing variations.

A classical approach to timing analysis is to analyze each signal path in a circuit and determine the worst case timing. However, this approach produces timing predictions that are often too pessimistic and grossly conservative. As a result, statistical timing analysis (STA, also referred to as statistical static timing analysis or SSTA)—which characterizes timing delays as statistical random variables—is often used to obtain more realistic timing predictions. By modeling each individual delay as a random variable, the accumulated delays over each path of the circuit will be represented by a statistical distribution. As a result, circuit designers can design and optimize chips in accordance with acceptable likelihoods rather than worst-case scenarios.

In STA, a circuit is modeled by a directed acyclic graph (DAG) known as a timing graph wherein each delay source—either a logic gate or an interconnect—is represented as a node. Each node connects to other nodes through input and output edges. Nodes and edges are referred to as delay elements. Each node has a node delay, that is, a delay incurred in the corresponding logic gates or interconnect segments. Similarly, each edge has an edge delay, a term of signal arrival time which represents the cumulative timing delays up to and including the node that feeds into the edge. Each edge delay has a path history: the set of node delays through which a signal travels before arriving at this edge. Each delay element is then modeled as a random variable, which is characterized by its probability density function (pdf) and cumulative distribution function (cdf). The purpose of STA is then to estimate the edge delay distribution at the output(s) of a circuit based on (known or assumed) internal node delay distributions.

The three primary approaches to STA are Monte Carlo simulation, path-based STA, and block-based STA. As its name implies, Monte Carlo simulation mechanically computes the statistical distribution of edge delays by analyzing all (or most) possible scenarios for the internal node delays. While this will generally yield an accurate timing distribution, it is computationally extremely time-consuming, and is therefore often impractical to use.

Path-based STA attempts to identify some subset of paths (i.e., series of nodes and edges) whose time constraints are statistically critical. Unfortunately, path-based STA has a computational complexity that grows exponentially with the circuit size, and thus it too is difficult to practically apply to many modern circuits.

Block-based STA, which has largely been developed owing to the shortcomings of Monte Carlo and path-based STA, uses progressive computation: statistical timing analysis is performed block by block in the forward direction in the circuit timing graph without looking back at the path history, by use of only an ADD operation and a MAX operation:

ADD: When an input edge delay X propagates through a node delay Y, the output edge delay will be Z=X+Y.

MAX: When two edge delays X and Y merge in a node, a new edge delay Z=MAX(X,Y) will be formulated before the node delay is added.

Note that the MAX operation can also be modeled as a MIN operation, since MIN(X,Y)=−MAX(−X,−Y). Thus, while a MIN operation can also be relevant in STA analysis, it is often simpler to use only one of the MAX and MIN operators. For sake of simplicity, throughout this document, the MAX operator will be used, with the understanding that the same results can be adapted to the MIN operator.

With the two operators ADD and MAX, the computational complexity of block based STA grows linearly (rather than exponentially) with respect to the circuit size, which generally results in manageable computations. The computations are further accelerated by assuming that all timing variables in a circuits follow the Gaussian (normal) distribution: since a linear combination of normally distributed variables is also normally distributed, the correlation relations between the delays along a circuit path are efficiently preserved.

To illustrate, in the ADD operation ADD(X,Y)=Z, if both input delay elements X and Y are Gaussian random variables, then the delay Z=X+Y will also be a Gaussian random variable whose mean and variance are:

$$\text{Mean: } \mu_Z = \mu_X + \mu_Y \quad (1)$$

$$\text{Variance: } \sigma_Z^2 = \sigma_X^2 + \sigma_Y^2 + 2\text{cov}(X,Y) \quad (2)$$

Where $\text{cov}(X,Y) = E\{(X-\mu_X)(Y-\mu_Y)\}$ is the covariance between X and Y.

In contrast, in the MAX operation Z=MAX(X,Y), MAX is a nonlinear operator: even if the input delays X and Y are Gaussian random variables, Z will not (usually) have a Gaussian distribution. However, as shown in C. Clark, "The greatest of a finite set of random variables," *Operations Research*, pp. 145-162, March 1961, if X and Y are Gaussian and statistically independent, the first and second moments of the distribution of MAX(X,Y) are defined by:

$$\text{Mean: } \mu_Z = \mu_X \cdot Q + \mu_Y(1-Q) + \theta P \quad (3)$$

Variance:

$$\sigma_Z^2 = (\mu_X^2 + \sigma_X^2)Q + (\mu_Y^2 + \sigma_Y^2)(1-Q) + (\mu_X + \mu_Y)\theta P - \mu_Z^2 \quad (4)$$

where $\theta = \sigma_{(X-Y)}$. P and Q are the pdf and cdf of the standard Gaussian distribution evaluated at $\lambda = \mu_{(X-Y)}/\sigma_{(X-Y)}$:

$$P(\lambda) = \frac{1}{\sqrt{2\pi}} \exp\left(-\frac{\lambda^2}{2}\right) \qquad (5)$$

$$Q(\lambda) = \int_{-\infty}^{\lambda} P(x)dx$$

It is then possible to define a Gaussian approximation for the non-Gaussian Z=MAX(X,Y). In C. Visweswariah, K. Ravindran, and K. Kalafala, "First-order parameterized block-based statistical timing analysis," TAU'04, February 2004, the Z=MAX(X,Y) is approximated by a Gaussian random variable $\tilde{Z}$ which is a linear combination of X, Y, and an additional independent Gaussian random variable Δ:

$$Z=\mathrm{MAX}(X,Y) \approx QX+(1-Q)Y+\Delta = \tilde{Z} \qquad (6)$$

where Q is defined in the foregoing Equation (5), and is referred to as "tightness." The purpose of the additional random variable Δ is to ensure that the first and second moments (the mean and the variance) of $\tilde{Z}$ match those of Z as specified in the foregoing Equations (3) and (4).

In the foregoing Clark reference, it was shown that if W is a Gaussian random variable, then the cross-covariance between W and Z=MAX(X,Y) can be found analytically as:

$$\mathrm{cov}(W,Z) = Q\mathrm{cov}(W,X) + (1-Q)\mathrm{cov}(W,Y) \qquad (7)$$

Substituting Equation (6):

$$\mathrm{cov}(W,\tilde{Z}) = Q\mathrm{cov}(W,X) + (1-Q)\mathrm{cov}(W,Y) = \mathrm{cov}(W,Z)$$

Hence, a convenient property of the approximator $\tilde{Z}$ is that the cross-covariance between Z and another timing variable W is preserved when the non-Gaussian Z=MAX(X,Y) is replaced by the Gaussian random variable $\tilde{Z}$. Thus, the use of the Gaussian random variable $\tilde{Z}$ as an approximation to the non-Gaussian Z=MAX(X,Y) allows preservation of linearity.

Unfortunately, one flaw of block-based STA is that its underlying assumption of a simple linear (additive) combination of sequential path delays is often incorrect. The delays of elements in a circuit can be correlated due to various phenomena, two common ones being known as global variations and path reconvergence. Global variations are effects that impact a number of elements simultaneously, such as inter- or intra-die spatial correlations (gate channel length variations, wire geometry variations, etc.), temperature or supply voltage fluctuations, etc. These generate global correlations between delay elements, wherein all globally correlated elements are simultaneously affected. An example of the effect of global variations is schematically depicted in FIG. 1(a), wherein node delays X, Y, and Z all depend on some influence g.

Path reconvergence occurs where elements share a common element or path along their past path histories owing to path intersections, and this leads to path correlation (local correlation of elements along some section of a path). An example of the effect of path correlation is schematically depicted in FIG. 1(b), wherein edge delays X and Y both depend on node delay p.

The underlying problem of global and path correlation is that while the output of the MAX operator can be directly approximated by a Gaussian distribution having its first two moments matching those of Equations (3) and (4), this approach fails to retain any correlation information after the MAX operation is performed. In short, the MAX operator destroys correlation information which may be critical to accurate timing prediction. Several approaches have been proposed for dealing with global and path correlation, but the field of timing analysis is lacking in methods for accounting for both of these correlations in an accurate and computationally efficient manner.

One approach to compensating for global variations is to use a canonical timing model (C. Visweswariah, K. Ravindran, and K. Kalafala, "First-order parameterized block-based statistical timing analysis," TAU'04, February 2004; A. Agarwal, D. Blaauw, and V. Zolotov, "Statistical timing analysis for intra-die process variations with spatial correlations," Computer Aided Design, 2003 International Conference on. ICCAD-2003, pp. 900-907, November 2003; H. Chang and S. S. Sapatnekar, "Statistical timing analysis considering spatial correlations using a single pert-like traversal," ICCAD'03, pp. 621-625, November 2003). In the canonical timing model, each of the node delays is represented as a first order (linear) summation of three terms:

$$n_i = \mu_i + \alpha_i R_i + \sum_{j=1} \beta_{i,j} G_j \qquad (8)$$

where $n_i$ (i=1, 2, ...) is the random variable representing the ith node delay in the timing graph; $\mu_i$ is the expected or nominal value of $n_i$; $R_i$, is the local variation (also called node variation), a zero-mean, unity variance Gaussian random variable representing the localized statistical uncertainties of $n_i$; $G_j$ represents the jth global variation, and is also modeled as a zero-mean, unity variance Gaussian random variable; $\{R_i\}$ and $\{G_j\}$ are additionally assumed to be mutually independent; and the weight parameters $\alpha_i$ (named node sensitivity or local sensitivity) and $\beta_{i,j}$ (named global sensitivity) are deterministic constants, explicitly expressing the amount of dependence of $n_i$ on each of the corresponding independent random variables.

With this canonical representation, the variance of a node delay $n_i$ and its correlation (covariance) with another node delay $n_k$ can be evaluated as:

Variance:

$$\sigma_{n_i}^2 = E\{(n_i - \mu_i)^2\} = \alpha_i^2 + \sum_j \beta_{i,j}^2 \qquad (9)$$

Covariance:

$$\mathrm{cov}(n_i, n_k) = E\{(n_i - \mu_i)(n_k - \mu_k)\} = \sum_j \beta_{i,j} \beta_{k,j} \qquad (10)$$

The linear/first order canonical timing model (8) provides an elegant way to deal with the correlated gate/wire delays arising from global variations, as discussed in the references noted above. The delay computed from the canonical timing model (8) will be Gaussian since it is a linear combination of Gaussian random variables, which may be acceptable for cases when the variation is small and the nonlinear relationship between the gate/wire delay and the global variation sources is not significant. However, when the variation becomes larger (e.g., as circuit technology scales down to nanometer levels), the nonlinearity of the gate/wire delay as a function of the global variations will be more and more significant, and cannot be accurately approximated by the linear canonical timing model. In these cases, even where the global variations $G_j$, local variations $R_i$, etc. are modeled as Gaussian random variables, the gate/wire delays $n_i$ are generally not Gaussian-distributed random variables. Thus, there is a need for a timing model which more accurately represents the nonlinear relationship between the gate/wire delay and the global variation sources, and will therefore yield more accurate STA for smaller and/or higher-speed deep-sub-micron IC circuits, where relative magnitudes of global variations are often larger. Given that the trend in circuit fabrication is to ever-increasing speed and ever-decreasing size, there is clearly a pressing need for accurate methods of statistical timing analysis which compensate for both global and path correlation, and which are computationally efficient so that rapid design and testing is feasible.

SUMMARY OF THE INVENTION

The invention, which is defined by the claims set forth at the end of this document, is directed to methods of block-based statistical timing analysis (STA) which can at least partially alleviate the foregoing drawbacks of prior STA methods. A basic understanding of some of the preferred features of the invention can be attained from a review of the following brief summary of the invention, with more details being provided in the following section of this document entitled Detailed Description of Preferred Versions of the Invention.

The following Section A of this document discusses an improved timing model, referred to herein as the quadratic timing model, which can be used to represent all delay elements (both nodes and edges) in a circuit with very high accuracy (approaching that of Monte Carlo simulation). A preferred form for the quadratic timing model represents the signal delay D of each element in a circuit as:

$$D = \mu_D + \sum_{j=1}^{N} \alpha_j R_j + \sum_{i=1}^{M} \beta_i G_i + \sum_{i=1}^{M} \sum_{k=1}^{M} \Gamma_{i,k} G_i G_k$$

wherein:
  $\mu_D$ is a nominal expected value for signal delay D;
  N is the number of signal delays in the circuit;
  $\alpha_j$ is a weight, referred to as a node sensitivity coefficient, which reflects the dependence of the signal delay D on signal delay j in the circuit;
  $R_j$ is a local variation reflecting the uncertainty in the value of signal delay D localized in the signal delay j;
  M is the number of global variations in the circuit;
  $G_i$ and $G_k$ are global variations reflecting the uncertainty in the value of signal delay D, with such uncertainty being shared by the signal delay D and one or more other signal delays i and k in the circuit;
  $\beta_i$ is a weight, referred to as a first-order global sensitivity coefficient, reflecting the dependence of D on global variation $G_i$ in the circuit; and
  $\Gamma_{i,k}$ is a weight, referred to as a second-order global sensitivity coefficient, reflecting the dependence of D on both of global variations $G_i$ and $G_k$ in the circuit.

As discussed in Section A of this document, the various coefficients of the quadratic delay model can be analytically extracted from a circuit design (e.g., from a SPICE model of a circuit), or can be experimentally extracted from an actual circuit, to allow subsequent modeling.

Section B of this document then discusses a convenient model for the spatial correlation of global variations. Each global variation G is preferably presumed to vary in value between two locations A and B in the circuit such that $cov(G_A, G_B)$ decreases as the distance between locations A and B increases (with $G_A$ being the global variation at location A, and $G_B$ being the global variation at location B). More preferably, $cov(G_A, G_B)$ decreases exponentially with the distance between locations A and B, with a particularly preferred representation being:

$$cov(G_A, G_B) = \sigma_G^2 \exp\left(-\frac{r_{AB}}{r_c}\right)$$

wherein
  $G_A$ is the global variation at location A;
  $G_B$ is the global variation at location B;
  $\sigma_G$ is the standard deviation of the global variation G,
  $r_{AB}$ is the distance between locations A and B; and
  $r_c$ is a nonzero constant spatial correlation distance.

Here, the circuit is preferably partitioned into an array of elements of at least substantially equal size (e.g., by defining a grid of squares over the circuit), and with each element being assumed to have uniform properties (e.g., global variation), and defining $r_{AB}$ as the distance between elements A and B. The spatial correlation distance $r_c$ is then set to the product of the element size and a user-defined parameter referred to herein as resolution—in other words, resolution is inversely proportional to grid size. Since a finer grid increases accuracy, but also increases calculation time, the user-defined resolution parameter allows a convenient way for a user to balance these competing objectives.

Section C of this document then discusses how to evaluate correlations between the various terms of the quadratic model, and how to evaluate distributions (pdfs and cdfs) for signal delays D.

Section D of this document then discusses the propagation of delays through the chip/circuit, the use of the ADD and MAX operations to effect such propagation, and the use of a convenient data structure—referred to as a MAX tuple—to decrease the computational burden of the MAX operation in circumstances where the inputs to the MAX operation cause it to act nonlinearly (since otherwise a linear MAX operation can be approximated with simpler operations, e.g., by a linear approximation). To illustrate, when a signal (which has its own delay) enters an element (which also has its own delay), the delay at the output of the element is simply the sum of the delays; here, the ADD operation can be performed by simply adding the corresponding quadratic coefficients of the delays. Otherwise, when two delays merge at an intersection, the greater of the two delays controls, and the MAX operation can be performed—and here it is convenient to use a computationally simple approximation for the (nonlinear) max operation, e.g., a linear approximation. However, in some cases, depending on the input delays, the output of the MAX operation is not well represented by a linear approximation. Thus, it is preferred that for any inputs to a MAX operation, the gaussianity (linearity) of the MAX operation should be checked, as by checking the skewness of the MAX output for the inputs in question. If the gaussianity meets some predefined threshold value (i.e., if the MAX operation is deemed sufficiently linear), a linear approximation of the MAX operation can be used for sake of computational ease, and its output delay can be propagated to subsequent elements in the circuit. On the other hand, if the gaussianity does not meet some predefined threshold value (i.e., if the MAX operation is deemed sufficiently nonlinear), rather than applying a linear or other approximation, the input delays are stored in a signal delay tuple (or MAX tuple) Mt—in essence, the delays are simply preserved in a segregated set. The signal delay tuple can then be propagated onwardly to subsequent elements in the circuit, and can be subjected to further ADD and MAX operations. If an ADD operation is performed wherein some delay D must be added to the signal delay tuple Mt, D is simply added to each signal delay within Mt. If a MAX operation needs to be performed with respect to the signal delay tuple Mt and some delay D, the signal delay D can be added to (stored in) the signal delay tuple Mt. Then, at that time or some later time, the size of the tuple Mt can be reduced (i.e., the number of delays therein can be reduced) by performing the MAX operation on some or all pairs of delays within the tuple, and for any pairs that have a linear output (as indicated, for example, by low skewness), each such pair can be replaced by a linear MAX approximation. Any remaining delays that cannot generate a MAX output which approximates a linear one can simply remain stored in the tuple. If the tuple survives until it reaches an output from the circuit, the delays therein can then be processed by Monte Carlo simulation to calculate the final output delay (or the tuple can be processed by simulation earlier, if desired).

Section E of this document then reviews experimental results using the foregoing methods. Further features and advantages of the invention will be apparent from the following detailed description of the invention in conjunction with the associated drawings.

DETAILED DESCRIPTION OF PREFERRED VERSIONS OF THE INVENTION

A. Quadratic Timing Model

Figure 1A:
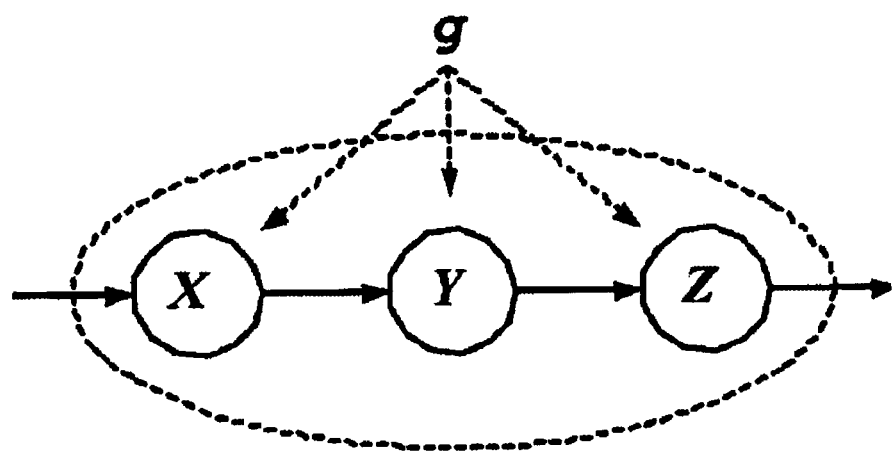
FIG. 1(a) depicts a timing graph schematically depicting the effect of influence g on nodes X, Y, and Z, illustrating global correlation of these nodes (and thus their edges being simultaneously affected by global variation).
Figure 1B:
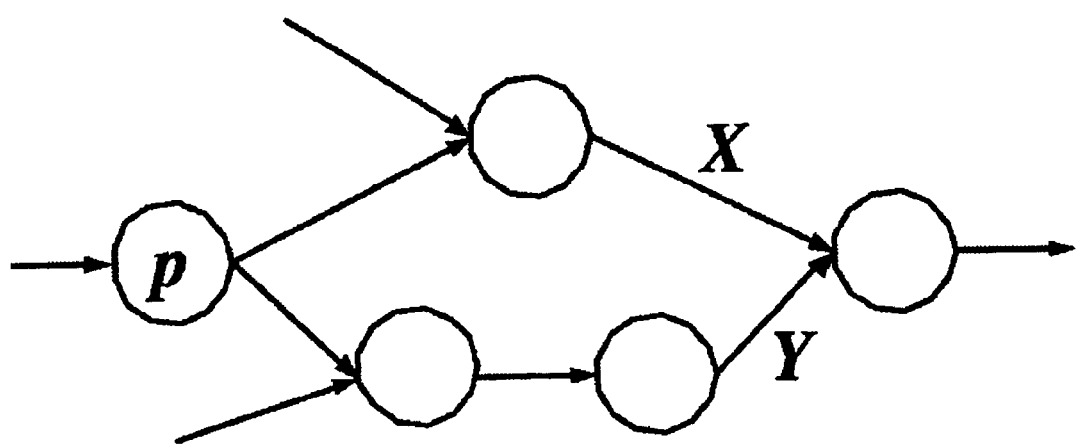
FIG. 1(b) depicts a timing graph schematically depicting the effect of node p on edges X and Y, wherein edges X and Y experience path correlation (local variation) owing to shared portions of their path histories.

The two most evident ways to treat the case when timing variables of a circuit become non-Gaussian are (1) to directly find the distribution of the non-Gaussian timing variable, and (2) to express the non-Gaussian timing variable as a nonlinear function of Gaussian random variables. The first approach is straightforward, but it is difficult to maintain the possible correlations among timing variables. With the second approach, the correlation among the non-Gaussian timing variables can be well expressed in terms of the correlations among the underlying Gaussian random variables—the approach taken below. (The reader is directed to U.S. patent application Ser. No. 11/282,003, filed Nov. 17, 2005 and incorporated by reference herein, for a discussion of further background and for alternative approaches.)

A.1. Taylor Expansion of Delay Function

Since a gate/wire delay's dependency on the global variation sources will usually be nonlinear, a Taylor expansion provides a useful means for systematic analysis of such a nonlinear relationship. Thus, a delay can be expressed in terms of a general Taylor expansion wherein $G_1, G_2, \ldots G_p$ are p Gaussian zero-mean, unity variance random variables:

$$D(G_1, G_2, \ldots, G_p) = \qquad (11)$$
$$m + \sigma R + \sum_{j=1}^{\infty} \left\{ \frac{1}{j!} \left( \sum_{i=1}^{p} G_i \frac{\partial}{\partial G'_i} \right)^j D(G'_1, G'_2, \ldots, G'_p) \right\}_{G'_1=G'_2=\ldots G'_p=0}$$

where $m=D(0, 0, \ldots, 0)$ and R is the local variation with zero mean and unit variance. Note that if the Taylor expansion is truncated at the first order, this results in the linear canonical timing model (8), and the m value will be the same as the mean value of the delay $m=\mu_D$. This will generally not be true for higher-order truncations. Also note that it is generally reasonable to assume that the local variation R is Gaussian, since it represents the overall effect of numerous local variations (variations localized in the gate/wire and only affecting the gate/wire delay to which they belong), and these numerous variations should be Gaussian-distributed in accordance with the law of large numbers.

It might be expected that the accuracy of timing delay estimation will increase if the Taylor expansion is truncated at higher-order terms, but this will of course incur greater computational cost. Thus, a reasonable trade-off has to be made between complexity and accuracy. Through experiment, it has been found that for variations up to about 10% of the nominal value, i.e., for σ/μ=10%, truncation at first-order terms is sufficiently accurate (i.e., the linear canonical timing model (8) is suitable). However, for cases where variation is larger than the 10% of the nominal value, significant error occurs with use of the linear canonical timing model (8), meaning that higher-order terms are needed for accurate timing. For variations up to 30%, experiments show that truncation at the second order terms will be sufficient to get reasonable accuracy. Since it is rare to have higher variations than 30%, it is reasonable in most cases to proceed with a quadratic model.

A.2. Quadratic Gate Delay Model

The gate delay $D_g$ is a nonlinear function of the global variations. Truncating equation (11) up to the second order, the quadratic gate delay model can be formulated as:

$$D_g \approx m_g + \alpha R + \frac{\partial D_g}{\partial L}L + \frac{\partial D_g}{\partial V}V + \ldots + \frac{1}{2}\frac{\partial^2 D_g}{\partial L^2}L^2 + \frac{\partial^2 D_g}{\partial L \partial V}LV + \frac{1}{2}\frac{\partial^2 D_g}{\partial V^2}V^2 + \ldots \quad (12)$$

where $m_g$ is a constant and L, V ... are global variations. The coefficients in this Taylor expansion can be analytically extracted from the model of the gate delay (e.g., in the SPICE or other circuit simulation model) using finite difference methods. More specifically, one can obtain the coefficients for a gate by generating many designs for the gate, each of which has a different set of predefined parameters. SPICE simulation of all these gates will yield a hyper-plane of the gate delay versus all parameters. The Taylor expansion coefficients can then be obtained by fitting the hyper-plane with the polynomial equation (12). Thus, the following discussion will assume that the coefficients are known in advance.

Assume that there are p global variation variables. One may then define a p×1 Gaussian variation vector $$\delta_g = [G_1, G_2, \ldots, G_p]^* \sim N(0, \Sigma g)$$

where "*" represents the transpose operation. 0 is a zero vector. The correlation matrix ($\Sigma g = E\{\delta_g \delta_g^*\}$) is a p×p matrix. Generally it is not a unit matrix I since the global variations may be correlated. With these definitions, one may reexpress equation (12) in compact vector form as:

$$D_g = m_g + \alpha R + \beta_g^* \delta_g + \delta_g^* \Gamma_g \delta_g \quad (13)$$

wherein the vector $\beta_g$ and the matrix $\Gamma_g$ are vectorized representations of the Taylor expansion coefficients in equation (12):

$$\beta_g(i) = \frac{\partial D_g}{\partial G_i} \text{ and } \Gamma_g(i,j) = \frac{1}{2}\frac{\partial^2 D_g}{\partial G_i \partial G_j} \quad (14)$$

The gate delay $D_g$ can also be expressed in expanded form as:

$$D_g = m_g + \alpha R + \sum_i \beta_i G_i + \sum_{i,j} \Gamma_{i,j} G_i G_j \quad (15)$$

Figure 2A:
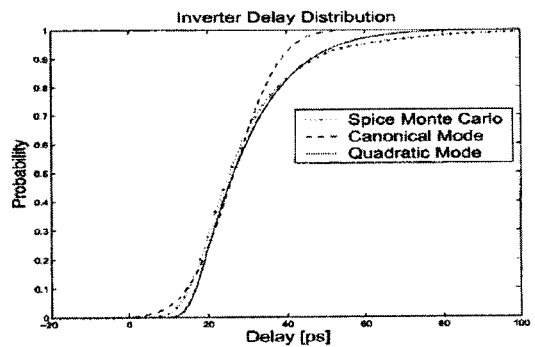
FIGS. 2(a) and 2(b) depict cumulative distribution functions (cdf) and probability distribution functions (pdf) for the delay generated by an exemplary gate (an inverter), with the cdfs and pdfs being calculated from Monte Carlo methods, the standard canonical model of equation (8), and the quadratic model of equation (15).
Figure 2B:
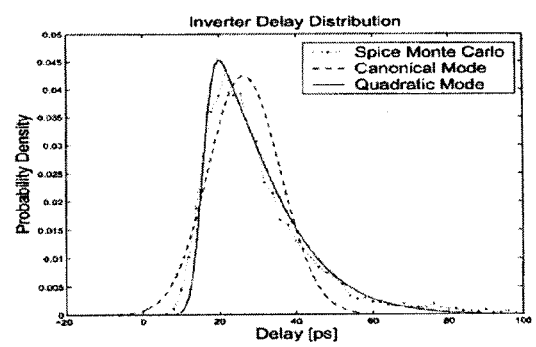

To illustrate the advantages of this quadratic gate delay model over the first order canonical model, FIGS. 2(a) and 2(b) present a comparison of the probability distributions of the delay of an exemplary inverter, as calculated using Monte Carlo methods (with each trial in the Monte Carlo simulation being run in a SPICE circuit simulator), with results from the standard canonical model of equation (8) and the quadratic model of equation (15), wherein in both cases the coefficients of the models were extracted from the SPICE model of the inverter. FIG. 2(b) illustrates that the "true" distribution (as represented by the Monte Carlo simulation) is significantly non-symmetric and non-Gaussian, and is not represented well by the standard canonical model of equation (8). The quadratic model of equation (15), on the other hand, shows significant improvement in accuracy and a far closer match to the Monte Carlo results.

A.3. Quadratic Interconnect Delay Model

The use of the quadratic model of equation (15) is not limited to gates, and may be extended to interconnects (leads/wires) as well. Consider a distributive interconnect delay model wherein a long interconnect is separated into N equal segments with length of L. Each interconnect segment i will have a width of $W_i$ and a thickness of $T_i$. These widths and thicknesses will then be considered as global variations with identical Gaussian distributions as $W_i \sim N(\mu_W, \sigma_W^2)$ and $T_i \sim N(\mu_T, \sigma_T^2)$. Elmore's interconnect delay model then states that the total interconnect delay will be:

$$D_w = \sum_{i=1}^{N}\sum_{j=i}^{N} R_i C_j = \sum_{i=1}^{N}\sum_{j=i}^{N} \frac{r_s L^2 (c_s W_j + c_f T_j)}{W_i T_i} \quad (16)$$

where $R_j$ and $C_j$ are the resistance and capacitance of the interconnect segment i; $r_s$ is the resistivity of the interconnect; and $c_s$ and $c_f$ are the sheet and fringe unit capacity of the interconnect. Applying the Taylor expansion to the Elmore's delay and truncating it to the second order, the quadratic interconnect delay model can be expressed in a manner similar to equation (13):

$$D_w \approx m_w + \alpha R + \beta_w^* \delta_w + \delta_w^* \Gamma_w \delta_w \quad (17)$$

where $\delta_w$ is a 2N×1 global variation vector:

$$\delta_w = [W_1', W_2', \ldots, W_N', T_1', T_2', \ldots, T_N']^* \sim N(0, \Sigma_w) \quad (18)$$

with $W'_i = (W_i - \mu_W)/\sigma_W$ and $T'_i = (T_i - \mu_T)/\sigma_T$.

Figure 3A:
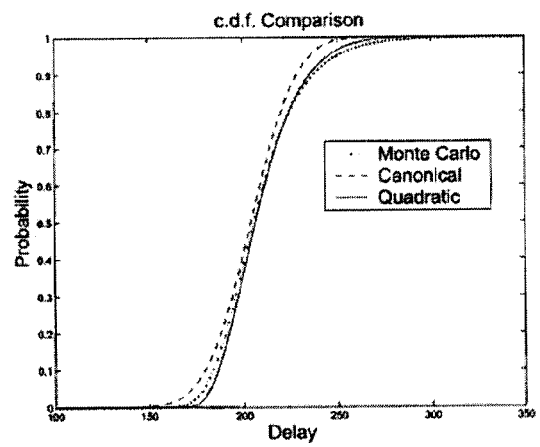
FIGS. 3(a) and 3(b) depict cumulative distribution functions (cdf) and probability distribution functions (pdf) for the delay generated by an exemplary interconnect (a wire/lead extending to/from one or more gates), with the cdfs and pdfs being calculated from Monte Carlo methods, the standard canonical model of equation (8), and the quadratic model of equation (15).
Figure 3B:
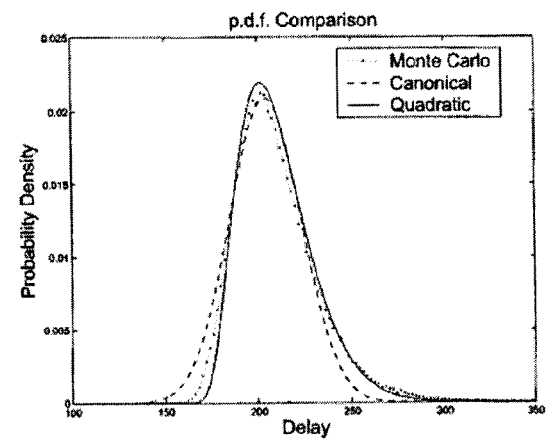

It is important to notice that the width and thickness random variables are generally not statistically independent to each other, and rather are spatially correlated (i.e., they will often increase or decrease together over any given lengths). Due to the non-linear dependency of the interconnect delay on the width and thickness variations of equation (16), the interconnect delay distribution will not be Gaussian even if the width and thickness variations are considered to be Gaussian. This is illustrated by the Monte Carlo results illustrated in FIG. 3, wherein the probability distributions generated by the standard canonical model of equation (8) and the quadratic model of equation (17) are also illustrated. Again, the quadratic delay model shows significant accuracy improvement (i.e., a far closer match to Monte Carlo results) over the standard canonical model.

B. Analytical Model of Spatial Correlation

Covariance

The global parameters affecting gate/interconnect delays, such as length L, voltage supply V, temperature T etc., are often dependent; for example, they might be spatially correlated, i.e., nearby gates/interconnects will have similar global variations between their global parameters. The question then becomes one of how to model the spatial correlation between the global parameter variations of spaced gates/interconnects.

Figure 4:
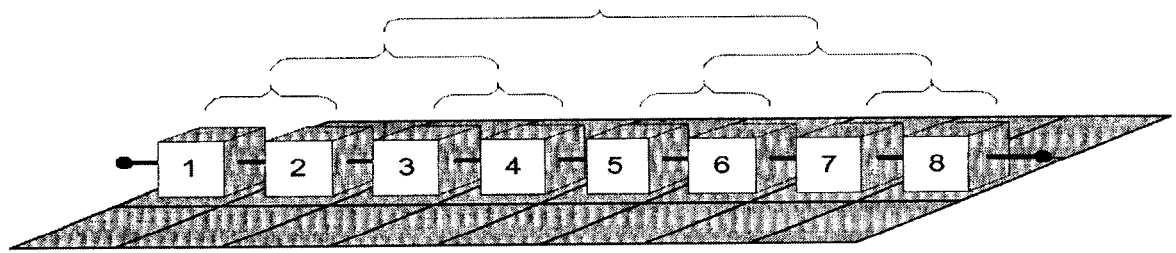
FIG. 4 is a schematic depiction of a wire/interconnect divided into eight cells/nodes by use of the quad-tree method, along with the quad-tree defined along the cells.

It can be expected that the global parameters between gates/interconnects at different positions will be statistically correlated by a monotonic decreasing function with respect to the distance between them: the greater the distance between gates/interconnects, the smaller the correlation between their global parameters. A convenient model is to grid (divide) the area of the chip/circuit being studied into cells, and assign each grid cell (and the structures therein) an individual global variation for the global parameter under consideration. A model of this nature, called a quad-tree model, was proposed in the aforementioned Agarwal et al. reference (A. Agarwal, D. Blaauw, and V. Zolotov, "Statistical timing analysis for intra-die process variations with spatial correlations," Computer Aided Design, 2003 International Conference on. ICCAD-2003, pp. 900-907, November 2003.) to model the spatial correlation within the STA framework. A hierarchical tree structure termed a quad-tree is built to connect the grid cells together, and the correlations between the parameters of different grid cells are computed by counting the number of parent tree nodes they share. However, this model can in some cases bear significant inaccuracies since there are always nodes (gates/interconnects) which are spatially close to each other (and thus their global parameters are more highly correlated), but they belong to different subtrees in the quad-tree (in which case the quad-tree will fail to capture their correlation). To illustrate, if the quad-tree method is used to model the spatial correlation in an eight-segment straight wire (see FIG. 4), the quad-tree becomes a binary tree if the quad-partitioning is along the wire. The correlation between global parameters in wire segments 2 and 3, 4 and 5, etc. will be similar to that between wire segments 1 and 2 since they are similarly spatially separated. However, according to the quad-tree method, the spatial correlation between segments in the first-level trees (1 and 2, 3 and 4, etc.) will be the largest, that between segments in the second level trees (e.g., between 2 and 3) will be second largest, and that between the top-level trees (e.g., between 4 and 5) will be the smallest. As a result, the quad-tree model fails to define similar spatial correlations when the distances between structures are similar.

Figure 5:
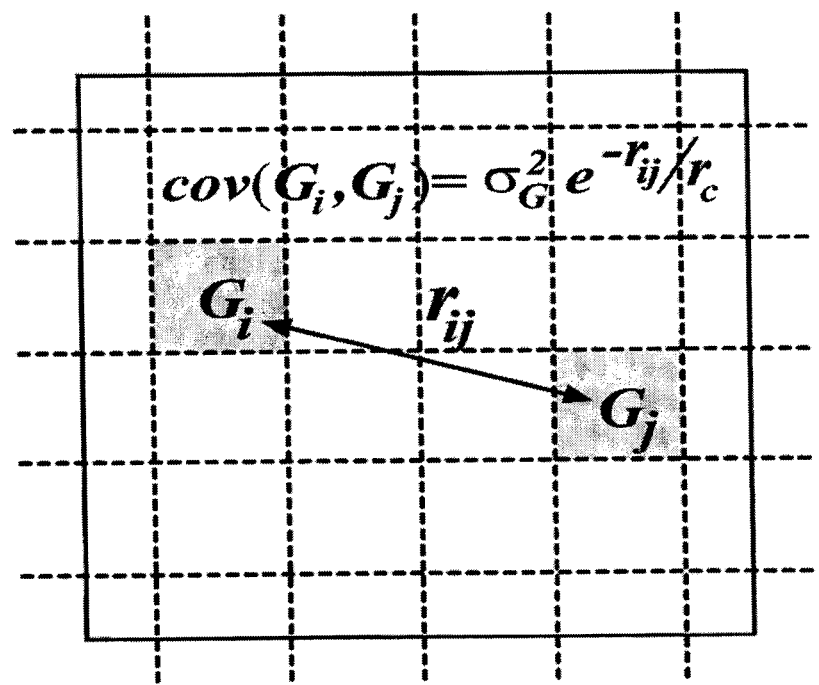
FIG. 5 is a schematic representation of a grid overlaid on a chip/circuit model, with a spatial correlation function being used to define the global parameter correlations between gates/interconnects in the various cells of the grid.

The invention preferably models the spatial correlation between the global parameters of chip/circuit structures as an analytical function of their distance which fits the measurement data obtained from manufactured chips. For purposes of illustration, here it is assumed to be an exponential decaying function, although the methodology is not restricted to such an exponential form. Looking to FIG. 5, a global variation G is presumed to have a covariance between positions i and j:

$$\text{cov}(G_i, G_j) = \sigma_G^2 \exp\left(-\frac{r_{ij}}{r_c}\right) \quad (19)$$

where $\sigma_G^2$ is the variance of the considered global variation, $r_{ij}$ is the distance between positions i and j, and the constant $r_c$ is a quantity termed the characteristic spatial correlation distance of the considered global variation. The spatial correlation distance $r_c$, which is basically a measure of the distance on the chip/circuit beyond which the global variations of two elements will be independent, can be extracted experimentally from a chip, or can be set to an expected value based on analytical models and/or prior experimental values. Obviously, the longer the spatial correlation distance $r_c$, the stronger the spatial correlation.

Intuitively, it seems desirable to have a very fine grid to enhance accuracy. However, a fine grid will result in a large covariance matrix, which will significantly increase computation times. To attain a reasonable balance between accuracy and performance, it is preferred that the grid size be based on the spatial correlation distance of the considered global parameter through a user-defined parameter termed resolution, the ratio of spatial correlation distance to grid cell size:

resolution=spatial correlation distance/grid cell size

Figure 6A:
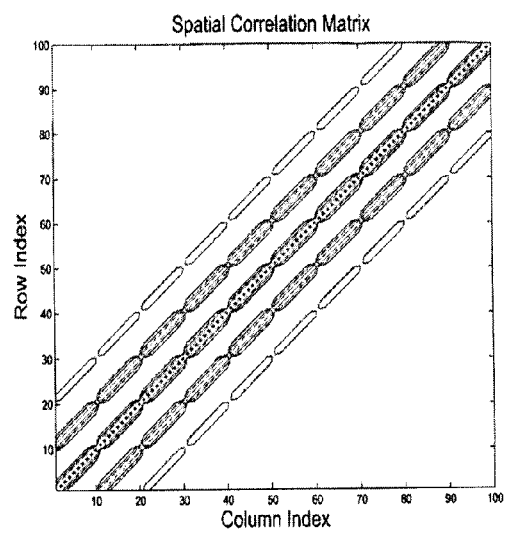
FIGS. 6(a)-6(c) illustrate the spatial correlation (covariance) matrix for different chip and grid sizes where the spatial correlations between the global parameters of the cells in the grid (and the gates/interconnects therein) are defined by equation (19).
Figure 6B:
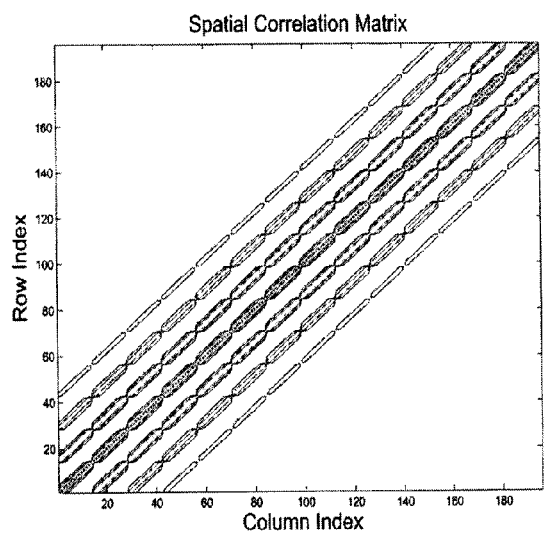
Figure 6C:
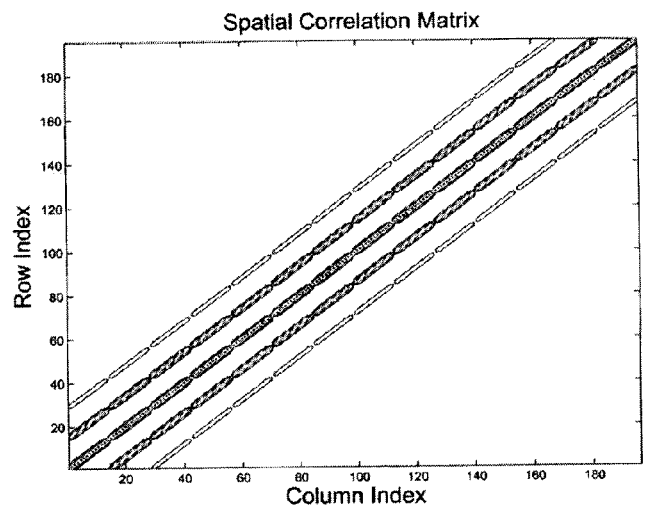

Thus, higher resolution will require a finer grid, or a higher spatial correlation distance. To illustrate the effect of resolution, FIGS. 6(a)-6(c) illustrate the spatial correlation (covariance) matrix for the following situations:
FIG. 6(a):
resolution=1
chip area 1000×1000 μm²
characteristic spatial correlation distance $r_c$=100 μm
FIG. 6(b):
resolution=1.4
chip area 1000×1000 μm²
characteristic spatial correlation distance $r_c$=100 μm
FIG. 6(c):
resolution=1
chip area 1400×1400 μm²
characteristic spatial correlation distance $r_c$=100 μm As seen in these Figures, the covariance matrix always has a "band" structure where the number of bands in the matrix is decided by the user-defined resolution parameter. As resolution is set higher, the number of bands increases and sparsity of the matrix decreases (as particularly shown in FIGS. 6(a) and 6(b)). If resolution is constant, so is the number of bands, and the number of total significant elements in the covariance matrix is then proportional to the number of global variations, i.e. the dimension of the covariance matrix (as particularly shown in FIGS. 6(b) and 6(c)).

C. Correlations and Distributions for Quadratic Timing Model

During timing analysis of a given circuit, the signal arrival time at each interconnect is the cumulative effect of all gate/interconnect delays in its input cone (i.e., in all gates/interconnects that have at least one signal propagation path leading to the interconnect). If all gate/interconnect delays are expressed in the quadratic forms of Equations (13) and (17), and if only linear operations are involved during timing analysis, then the arrival time $D_a$ will also have the quadratic form as:

$$D_a = m_a + \alpha_a * r_a + \beta_a * \delta_a + \delta_a * \Gamma_a \delta_a \quad (20)$$

wherein there are q gate/interconnect delays in the input cone of the net's arrival time $D_a$, p global variations are involved in these q gate/wire delays, and the random variation vector $r_a = [R_1, R_2, \ldots, R_q]^* \sim N(0, I)$ is assumed to be independent on $\delta_a = [G_1, G_2, \ldots, G_p]^* \sim N(0, \Sigma_a)$.

It is important to note that the foregoing model assumes that all operations during timing analysis are linear operations. This assumption is merely an approximation since there will always be non-linear MAX/MIN operations involved when computing the arrival time.

Mathematically, the gate/interconnect delay equations of (13) and (17) are only special cases of Equation (20), so Equations (13), (17), and (20) can be summarized as follows: if every arrival time in a circuit is approximated as a linear combination of its input gate/interconnect delays, and all gate/interconnect delays meet the quadratic delay formats of Equations (13) and (17), then all timing variables in the circuit, including gate/interconnect delays and arrival times, will have the quadratic timing model:

$$D \sim Q(m, \alpha, \beta, \Gamma) = m + \alpha^* r + \beta^* \delta + \delta^* \Gamma \delta \quad (21)$$

where $r \sim N(0, I)$ and $\delta \sim N(0, \Sigma)$ are mutually independent local variations and global variations.

Both linear and quadratic dependencies are present in the quadratic timing model (21). In order to evaluate the correlations between timing variables with quadratic forms, three types of correlation need to be computed: (1) correlation between linear terms; (2) correlations between linear and quadratic terms; and (3) correlations between quadratic terms. It can be shown, via a proof not reproduced here, that these correlations can be summarized as follows for random vector $d \sim N(0, S)$, sensitivity vectors a and $\beta$, and quadratic coefficient matrices $\Gamma$, $\Gamma_1$, and $\Gamma_2$:

$$E\{\delta^* \Gamma \delta\} = tr\{\Sigma \Gamma\} \quad (22)$$

$$cov(\alpha^* \delta, \beta^* \delta) = \alpha^* \Sigma \beta \quad (23)$$

$$cov(\delta, \Gamma \delta, \beta^* \delta) = 0 \quad (24)$$

$$cov(\delta^* \Gamma_1 \delta, \delta^* \Gamma_2 \delta) = 2tr\{\Sigma \Gamma_1 \Sigma \Gamma_2\} \quad (25)$$

where the function "tr{ ... }" means "trace," and is the sum of the diagonal elements of the matrix. Applying these definitions, correlations between the quadratic timing variables can be expressed as $$\text{mean: } \mu_D = E\{D\} = m + tr\{\Sigma \Gamma\} \quad (26)$$

$$\text{variance: } \sigma_D^2 = \alpha^* \alpha + \beta^* \Sigma \beta + 2tr\{\Sigma \Gamma \Sigma \Gamma\} \quad (27)$$

for quadratic timing variable $D \sim Q(m, \alpha, \beta, \Gamma)$, and for quadratic random variables $D_1 \sim Q(m_1, \alpha_1, \beta_1, \Gamma_1)$ and $D_2 \sim Q(m_2, \alpha_2, \beta_2, \Gamma_2)$, the correlation between them is:

$$cov(D_1, D_2) = \alpha_1^* \alpha_2 + \beta_1^* \Sigma \beta_2 + 2tr\{\Sigma \Gamma_1 \Sigma \Gamma_2\} \quad (28)$$

To compute the distribution of the quadratic timing variable D defined in equation (21), the statistical technique of characteristic functions can be used. For a random variable X, its characteristic function is defined as:

$$C_x(\xi) = E\{e^{j\xi X}\} = \int_{-\infty}^{+\infty} e^{j\xi X} f_X(x) dx \quad (29)$$

where $f_X(x)$ is the pdf of X. Since the characteristic function is actually an inverse fourier transform of the pdf, the pdf of the random variable X can be computed from its characteristic function:

$$fx(x) = \frac{1}{2\pi} \int_{-\infty}^{+\infty} e^{-j\xi x} C_x(\xi) d\xi \quad (30)$$

Thus, for the quadratic timing variable $D \sim Q(m, \alpha, \beta, \Gamma)$ defined in equation (21), its exact characteristic function can be analytically derived by substituting it into equation (29):

$$C_D(\xi) = E\{e^{j\xi D}\} = \int\int_{-\infty}^{+\infty} e^{j\xi(m + \alpha * r + \beta * \delta + \delta * \Gamma \delta)} f_R(r) f_G(\delta) dr d\delta \quad (31)$$

$$= |\Omega|^{-\frac{1}{2}} \exp\left\{j\xi m - \frac{1}{2}\xi^2 (\alpha * \alpha + \beta * \Sigma^{\frac{1}{2}} \Omega^{-1} \Sigma^{\frac{1}{2}} \beta)\right\}$$

where $f_R(r)$ and $f_G(\delta)$ are joint pdfs for Gaussian random vectors r and $\delta$ respectively; $|\Omega|$ is the determinant of matrix $\Omega = I - 2j\xi \Sigma^{1/2} \Gamma \Sigma^{1/2}$. The pdf of the quadratic time variable, $f_D(x)$, can then be computed from Equation (20). This will require one step of eigenvalue decomposition (computing $\Sigma^{1/2}$) and one step of fourier transformation in order to analytically compute the distribution of a quadratic timing variable, and this computation may be intensive. Fortunately, it is not necessary to compute the distribution at every step of the timing analysis; the distribution will usually only be requested once, at the primary output of the STA analysis.

D. STA with the Quadratic Timing Model

Figure 7:
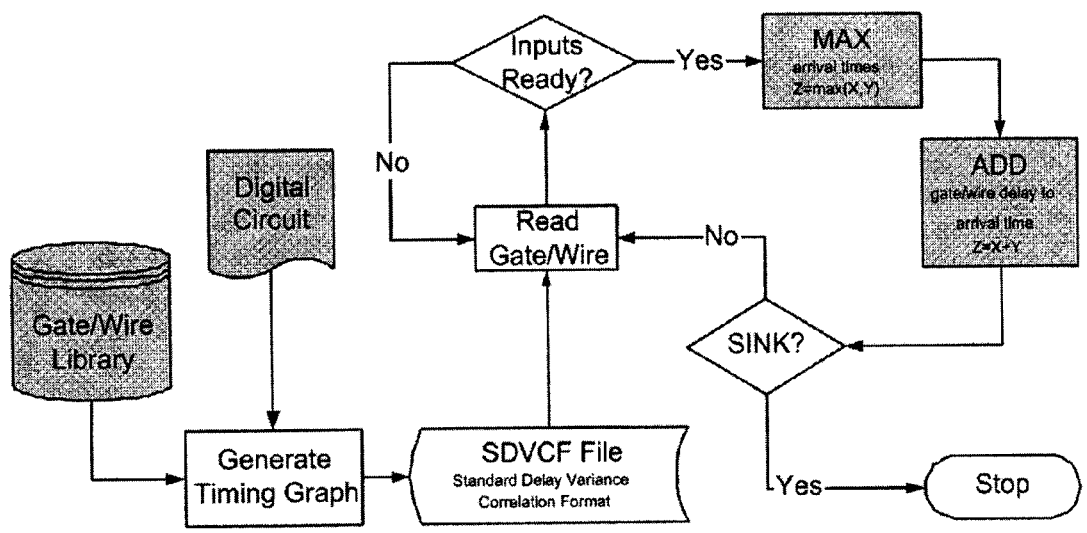
FIG. 7 is a block diagram of an algorithm by which the quadratic timing model can be used to calculate delays throughout a given chip/circuit model.
Figure 8:
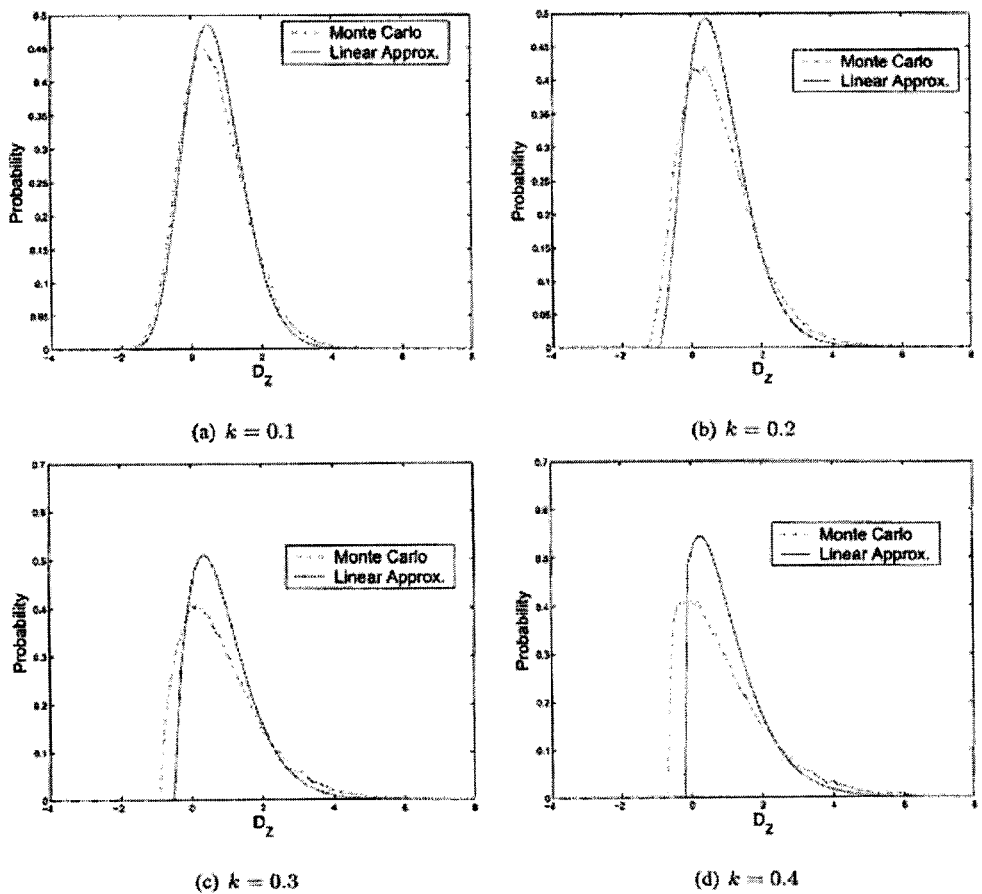
FIGS. 8(a)-8(d) show the probability density function (pdf), as calculated using Monte Carlo simulation and by a linear approximation for $D_Z=\max(D_c, D_Y)=\max(kX^2+X, kY^2+Y)$, at different quadratic coefficients k where X and Y are independent standard Gaussian random variables.

The foregoing methods can be implemented on a chip/circuit design by (for example) taking the SPICE model of the chip/circuit, extracting the quadratic parameters of individual gate/interconnects, and using the extracted parameters to form a gate/interconnect library. The chip/circuit design can then be translated into a timing graph which includes information about both the gate/interconnect connections and also the quadratic gate/interconnect delay parameters. A timing graph (or file or equivalent set of information) containing this set of information can be said to be in a standard delay variance correlation format (sdvcf), which can then be used to calculate and propagate delays throughout the chip/circuit (or more technically its timing graph) utilizing an algorithm such as that illustrated in FIG. 7.

As previously discussed, in block based timing analysis, the determination of arrival times involves two fundamental operations:

(1) ADD: When an input arrival time X propagates through a gate delay Y, the output arrival time will be Z=X+Y (2) MAX: When two arrival times X and Y merge in a gate, a new arrival time of Z=max(X, Y) is formulated before the gate delay is added.

The specifics of these operations, as implemented with the quadratic timing model, are discussed in greater detail below.

D.1. ADD Operation

If both X and Y are expressed in the quadratic form of Equation (21), with $X \sim Q(m_X, \alpha_X, \beta_X, \Gamma_X)$ and $Y \sim Q(m_Y, \alpha_Y, \beta_Y, \Gamma_Y)$, then the output of the ADD operator is straightforward:

$$Z = X + Y \sim Q(M_Z, \alpha_Z, \beta_Z, \Gamma_Z) \quad (32)$$

Where the quadratic parameters are computed as:

$$m_Z = m_X + m_Y$$

$$\alpha_Z = \alpha_X + \alpha_Y$$

$$\beta_Z = \beta_X + \beta_Y$$

$$\Gamma_Z = \Gamma_X + \Gamma_Y \tag{33}$$

D.2. Linear Approximation of MAX Operation

The MAX operator is more complicated than ADD since it is generally a non-linear operator, and error is introduced if MAX is approximated with a linear operator. Nevertheless, in the cases where MAX does behave linearly, it can be useful to compute the MAX output by use of an equivalent (or closely approximate) linear operator for sake of simplicity. However, there is then a question as to how linear the MAX operator is—can it be substituted with a linear operator without significant inaccuracy?

If the inputs of the MAX operator are Gaussian, one way to check linearity is to examine the skewness of its outputs: if a MAX operator is linear and has Gaussian inputs, it will also have Gaussian outputs. Stated differently, the linearity of the MAX operator can be evaluated by the Gaussianity of its output assuming its inputs are Gaussian. Skewness, which indicates the symmetry of a distribution, can then be applied to check Gaussianity (since a Gaussian distribution will always be symmetric).

If it is assumed that the MAX operation is performed on two Gaussian inputs whose mean and variance match those computed from the quadratic timing model (Equations (26) and (27)), output skewness can be computed using methods such as those discussed in C. Clark, "The greatest of a finite set of random variables," Operations Research, pp. 145-162, March 1961. There are then two possibilities, discussed below.

D.2(a). Linear MAX Approximation Accurate

If the skewness is smaller than some threshold value, it can be assumed that the MAX operator can be well approximated by a linear operator. If the linear function $\mathbf{Z} = a_X + b_Y + c$ is used as an approximation of $Z = \max(X,Y)$, the task becomes one of finding appropriate coefficients a, b, and c. This can be done by defining an appropriate error function, and finding a, b, and c where error is minimized. Thus, if $\mathbf{Z} = \Psi(X,Y)$ is an approximation of $Z = \max(X,Y)$ with random variables X and Y, then the error function can be defined as $$\Delta = \int\int_{-\infty}^{+\infty} [\max(x,y) - \psi(x,y)]^2 f_{XY}(x,y) dx dy \tag{34}$$

$$= E\{Z^2\} + E\{\hat{Z}^2\} - 2E\{Z\hat{Z}\}$$

where $f_{XY}(x, y)$ is the joint distribution of X and Y. If function $\mathbf{Z} = \Psi(X,Y)$ includes the parameters of $\lambda_1, \lambda_2, \ldots$, the optimum value of $\lambda_i$ (and the minimum value of the error function of Equation (34)) will then be determined by the following optimal condition:

$$E\left\{Z\frac{\partial \hat{Z}}{\partial \lambda_i}\right\} = E\left\{\hat{Z}\frac{\partial \hat{Z}}{\partial \lambda_i}\right\} \quad (i = 1, 2, \ldots) \tag{35}$$

Applying this optimal condition, the optimal values of a, b and c which minimize the error function defined in Equation (34) will be the solution of equations:

$$E\{Z\} = a\mu_X + b\mu_Y + c$$

$$\text{cov}(Z,X) = a \cdot \sigma_X^2 + b \cdot \text{cov}(X,Y)$$

$$\text{cov}(Z,Y) = a \cdot \text{cov}(X,Y) + b \cdot \sigma_Y^2 \tag{36}$$

Given quadratic timing variables of $X \sim Q(m_X, \alpha_X, \beta_X, \Gamma_X)$ and $Y \sim Q(m_Y, \alpha_Y, \Gamma_Y)$, $E\{Z\}$, $\text{cov}(X,Z)$, and $\text{cov}(Y,Z)$ can be analytically computed using equations set forth by Clark (C. Clark, "The greatest of a finite set of random variables," Operations Research, pp. 145-162, March 1961), and by treating $Z = \max(X, Y)$ as if MAX is operating on Gaussian random variables. The linear approximation parameters, a, b and c can then be solved as:

$$a = \Phi \quad b = 1 - \Phi \quad c = \phi \sigma_{X-Y} \tag{37}$$

where $\Phi$ and $\phi$ are respectively the cdf and pdf of the standard Gaussian distribution evaluated at $\mu_{X-Y}/\sigma_{X-Y}$. With such a linear approximation of the MAX operator, the quadratic timing variable $Z = \max(X,Y) \sim Q(m_Z, \alpha_Z, \beta_Z, \Gamma_Z)$ can then be computed as:

$$m_Z = a m_X + b m_Y + c$$

$$\alpha_Z = a \alpha_X + b \alpha_Y$$

$$\beta_Z = a \beta_X + b \beta_Y$$

$$\Gamma_Z = a \Gamma_X + b \Gamma_Y \tag{38}$$

Such a linear approximation for the MAX operation has two sources of error. First, the MAX inputs are assumed Gaussian, whereas in reality they are fundamentally non-Gaussian. Second, the MAX operator is itself nonlinear. As for the first of these error sources, the error is tolerable since non-Gaussianity is usually not severe. The MAX inputs are expressed in quadratic format (as in Equation (21)) during timing analysis, and their non-Gaussianity is actually decided by the relative magnitude of their quadratic coefficients versus their first order coefficients. To illustrate, FIGS. 8(a)-8(d) illustrate comparisons in the pdf, calculated using Monte Carlo simulation and the foregoing linear approximation, for MAX as performed on two quadratic timing variables, $D_X = kX^2 + X$ and $D_Y = kY^2 + Y$ (i.e., $D_Z = \max(D_X, D_Y) = \max(kX^2 + X, kY^2 + Y)$). It is seen that the larger the quadratic coefficient k is, the worse the linear approximation. However, even for larger quadratic coefficients (such as k=0.4), the linear approximation still performs reasonably well, particularly insofar as the error introduced by the non-Gaussianity of the MAX inputs will only make the linear approximation give a more pessimistic estimation than the Monte Carlo results. In other words, the linear approximation will provide a conservative and "safe" estimate, even though it will have some errors when the non-Gaussianity of the input timing variables is very large.

As for the second of the error sources—the fact that the MAX operator is fundamentally a non-linear operator—the error here will generally be acceptable as well, since MAX can, as demonstrated above, be well approximated by a linear operator for purposes of timing analysis.

Despite the foregoing, there will often be nodes in a given timing graph wherein the linear MAX approximation yields poor results (where the true MAX operator is highly nonlinear). If a linear approximation is used for these cases, the error this will introduce could possibly be amplified as it transfers to later nodes, resulting in unacceptable results. To avoid this problem, it is preferable to detect cases where MAX becomes significantly nonlinear—as by observing skewness, as discussed above—and either defer use of the linear approximation on these nodes, or else defer it (as will be discussed in the section below).

D.2(b). Linear MAX Approximation Inaccurate: Use of MAX Tuple

As discussed above, if the skewness is greater than some threshold value, it can be assumed that the MAX operator is not well approximated by a linear operator. In this case, it is not mandatory that the output of the MAX operation be immediately computed at the node in question, and rather the computation can be deferred. This can be done by simply recording the output of the MAX operation as a data structure termed the max tuple, Mt{X,Y}. The output can then be propagated to subsequent nodes using the following computations:

ADD: a gate/interconnect delay, D, is added into a max tuple Mt{X,Y} as:

$$Mt\{X,Y\}+D=Mt\{X+D,Y+D\} \quad (39)$$

aMAX: an arrival time, A, is MAXed with a max tuple Mt{X,Y} as:

$$\max(A,Mt\{X,Y\})=Mt\{A,X,Y\}$$

tMAX: two max tuples are MAXed together:

$$\max(Mt\{X,Y\},Mt\{U,V\})=Mt\{X,Y,U,V\} \quad (40)$$

To practically implement such tuple-based MAX evaluation and avoid memory/storage problems, the number of arrival times in the max tuple, i.e., the tuple size, is preferably maintained as small as possible. Tuple minimization can be achieved by the associative rule of max tuple:

$$Mt\{A,X,Y\}=Mt\{\max(A,X),Y\}=Mt\{A,\max(X,Y)\}=Mt\{X,\max(A,Y)\} \quad (41)$$

Thus, if a MAX operator on any two random variables in the max tuple behaves linearly, these two random variables can be replaced by their linear combination as shown in equation (38) so that the size of the max tuple is reduced. This reduction process can be iteratively performed to minimize the tuple size.

So, in short, if MAX inputs behave nonlinearly (e.g., if their skewness exceeds some threshold), these inputs can simply be stored in a MAX tuple, and the contents of the MAX tuple can be regularly checked for linearity between each/any two members (and these members can be MAXed out if their MAX output skewness is small enough). To prevent excessive growth of the tuple size, a safeguard maximum allowed size for the MAX tuple can be set, and if the MAX tuple grows to exceeds the maximum size, the skewness threshold can be increased to induce more tuple size reduction.

Finally, in the primary output of the chip/circuit where the delay is reported as MAX tuple (or at any earlier point in the circuit at which it is no longer desired to maintain the tuple), the delay can be evaluated by Monte Carlo simulation to get the requested pdf and/or cdf. This is accurate, and is also relatively efficient so long as the size of the MAX tuple is reasonable.

By using the foregoing conditional linear MAX operation—i.e., applying a linear approximation where appropriate, and storing remaining variables for later operation—computation efficiency is enhanced, and at the same time the error of the linear approximation for MAX operators is kept within an acceptable range.

To realize the foregoing tuple-based MAX evaluation, it is necessary to establish a method of analytically determining the nonlinearity of the MAX operator. Thus far, skewness has been noted as the preferred determination method (though it is important to be aware that other measures of nonlinearity could be used instead). While skewness is a possible indicator of linearity for the MAX inputs here, it is not an appropriate indicator of Gaussianity for random variables in general, since there are non-Gaussian distributions which are symmetric (i.e., which have low skewness). Skewness is nonetheless a workable measure of the linearity of the MAX operator because nonlinearity of the MAX operator will always change the symmetry of the distribution of the MAX output.

D.3. Computation Complexity

The foregoing methods of STA using the quadratic timing model will naturally have greater computation complexity than STA methods using the first order canonical timing model (8). This extra complexity will primarily arise from (1) the need to compute the moment of the quadratic form (using equations (26)-(28)); and (2) the need to update the quadratic coefficient matrix r using equations (33) and (38). Looking at these factors more carefully, in a circuit with N gates, assume there are t types of global variation sources and that there are also q global variation variables which account for spatial correlation. Both the correlation (covariance) matrix $\Sigma$ and the quadratic coefficient matrix $\Gamma$ are sparse matrices, with the number of non-zero elements in $\Gamma$ being $O(t^2)$, and matrix $\Sigma$ having $O(q)$ significant non-zero elements and a "band" structure as shown in FIGS. 6(a)-6(c). Since the types of global variation sources are usually limited for a particular technology, generally q>>t. As a result, the additional computation needed to switch from the first order timing model to the quadratic timing model will mainly arise from the moment evaluation equations (26)-(28). In these equations, the trace evaluation of the product of two matrices can be done in linear time $O(q)$ considering the "band" structure of the correlation (covariance) matrix $\Sigma$. However, since such moment evaluation has to be done at every timing step, the overall additional timing complexity required will be $O(q \times N)$ which is linear to both the number of global variations q and the size of the circuit N. Since the number of bands in $\Sigma$ is controlled by the user-defined resolution parameter, the higher the resolution, the more bands in the matrix and the longer the covariance computation time. On the other hand, the higher the resolution, the finer the grid and the more accurate of the correlation model. Thus, the user-defined resolution parameter provides a convenient way to balance accuracy and computational complexity when considering spatial correlation in statistical timing.

D.4. Application in Path Based SSTA

The foregoing discussion relates to use of the quadratic timing model in block-based STA, but it can be applied in path-based STA as well. As previously noted, path-based STA has the drawback that it relies on accurate selection of statistically critical paths, but assuming such critical paths are correctly selected, the overall delay distribution of the circuit can be computed straightforwardly using the quadratic timing model. The path delay for the ith critical path cpi will be the sum of all gate/wire delays in the path: $D_{cpi}=\Sigma_{g \in cpi} D_g$. When all gate/wire delays are represented in quadratic form, the path delay will also have the quadratic format as:

$$D_{cpi} \sim Q\left(\sum_{g \in cpi} m_g, \sum_{g \in cpi} \alpha_g, \sum_{g \in cpi} \beta_g, \sum_{g \in cpi} \Gamma_g\right) \quad (42)$$

So if there are n statistically critical paths, the overall delay distribution will be:

$$D_{all} = \max(D_{cp1}, D_{cp2}, \ldots, D_{cpn}) \quad (43)$$

Figure 9:
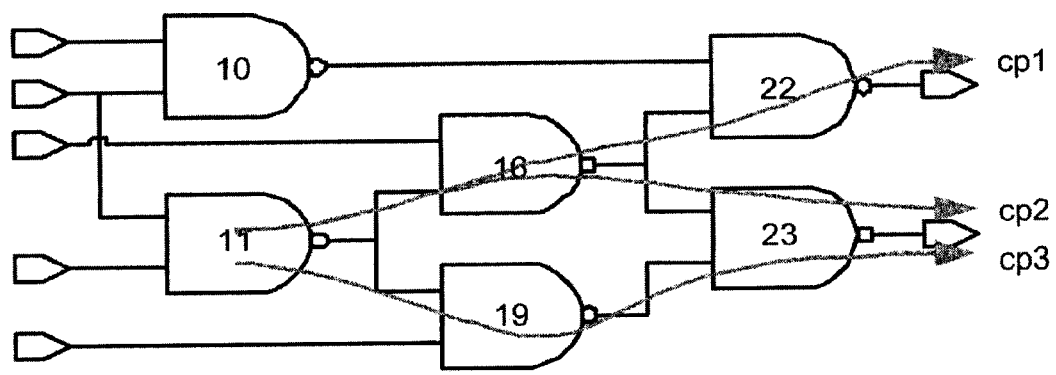
FIG. 9 is an exemplary circuit, illustrated with three different critical paths cp1, cp2, and cp3.

For example, the statistically critical paths for the circuit shown in FIG. 9 will be:

cp1: (11, 16, 22)

cp2: (11, 16, 23)

cp3: (11, 19, 23)

So the overall delay distribution will be $D_{all} = \max(D_{cp1}, D_{cp2}, D_{cp3})$, where each path delay can be computed from equation (42).

E. Simulations/Experimental Results

The proposed block based STA with quadratic timing model has been implemented in C/C++ and tested on ISCAS'85 benchmark circuits. The first order canonical timing model and Monte Carlo simulation (using 10,000 repetitions) were used for comparison purposes. Before the experiment, a simple standard gate library with gates of not, nand2, nand3, nor2, nor3, aoi22 and oai22 were constructed. The deterministic delay and statistical delay sensitivities of these library gates were extracted from their SPICE model as described in section A.2. The gates were also laid out using Cadence tools (Cadence, San Jose, Calif., USA), and their characteristics are measured from the layout. The ISCAS circuits are then synthesized using a Synopsys design compiler (Synopsys, Mountain View, Calif. USA) using the library models. The DRAGON placement tool (UCLA, Los Angeles, Calif. USA) was used to obtain the placement information needed for spatial correlation.

All parameters were assumed to have $\sigma/\mu = 30\%$ of variations. Three parameters, gate length (L), supply voltage (V), and temperature (T) were considered to be global variation sources, and their correlation distances were all assumed to be 100 μm for illustrative purposes. The spatial correlation resolution was set to be 3 for all three global parameters so that the size of the grid cells covering the circuit was 33 μm. All other variation sources were assumed to be localized, and their effect on the gate delay was lumped into a single local variation term.

Timing results from both the quadratic and first order timing models, as well as from Monte Carlo simulation are shown in TABLE I. Since the time random variables—either gate/wire delays or arrival times—are modeled as non-Gaussian random variables, the mean (μ) and standard deviation (σ), used for standard first order canonical delay cases, are not sufficient to characterize the distributions of the variables. Thus, the 97.7% quartile of the output arrival time distribution, $\tau_{97}$, is also provided in TABLE I. The estimation error (as determined versus Monte Carlo results) is also shown in parentheses in TABLE I, and this illustrates that significant accuracy improvement occurs by switching the delay model from first order canonical to quadratic.

TABLE 2

| Circuit | STA Method | Delay Distribution (ps) | | |
|---|---|---|---|---|
| | | μ | σ | $\tau_{97}$ |
| c432 | Monte Carlo | 1828 | 779 | 3490 |
| | Quadratic | 1853 (1/4%) | 734 (5.8%) | 3360 (2.3%) |
| | Canonical | 1653 (9.5%) | 537 (31%) | 2650 (24%) |
| c880 | Monte Carlo | 1843 | 753 | 3440 |
| | Quadratic | 1867 (1.3%) | 689 (8.5%) | 3360 (2/3%) |
| | Canonical | 1671 (9.4%) | 448 (40%) | 2500 (27%) |
| c1355 | Monte Carlo | 1811 | 746 | 3280 |
| | Quadratic | 1828 (0.9%) | 697 (6.6%) | 3360 (2.4%) |
| | Canonical | 1636 (9.7%) | 485 (35%) | 2530 (23%) |
| c1908 | Monte Carlo | 2437 | 914 | 4410 |
| | Quadratic | 2432 (0.2%) | 880 (3.8%) | 4370 (0.9%) |
| | Canonical | 2190 (10%) | 695 (24%) | 3490 (20%) |
| c2670 | Monte Carlo | 2666 | 1019 | 4840 |
| | Quadratic | 2738 (2.7%) | 860 (16%) | 4620 (4.6%) |
| | Canonical | 2404 (10%) | 618 (39%) | 3560 (26%) |
| c3540 | Monte Carlo | 3468 | 1344 | 6230 |
| | Quadratic | 3499 (0.9%) | 1309 (2.6%) | 6370 (2.3%) |
| | Canonical | 3136 (10%) | 936 (30%) | 4870 (22%) |
| c6288 | Monte Carlo | 8798 | 3785 | 16799 |
| | Quadratic | 9393 (6.8%) | 3535 (6.6%) | 16639 (1.0%) |
| | Canonical | 7950 (10%) | 2661 (30%) | 12919 (23%) |
| c7552 | Monte Carlo | 2440 | 981 | 4510 |
| | Quadratic | 2489 (2.0%) | 828 (15%) | 4270 (5.3%) |
| | Canonical | 2202 (10%) | 599 (39%) | 3310 (27%) |

Figure 10:
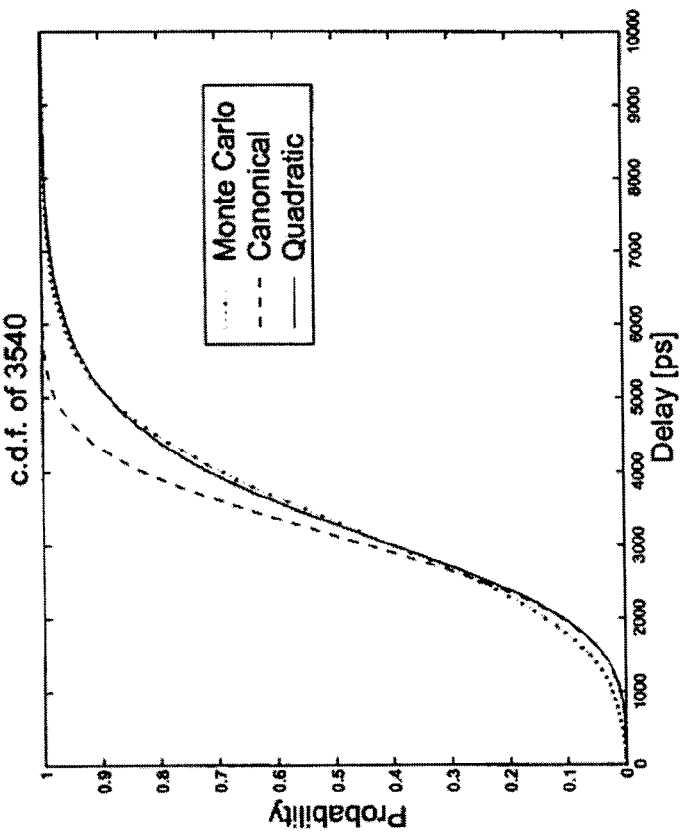
FIG. 10(a)-(b) depict cumulative distribution functions (cdf) and probability distribution functions (pdf) for the delay in a ISCAS c3540 benchmark test circuit, with the cdfs and pdfs being calculated from Monte Carlo methods, the standard canonical model of equation (8), and the quadratic model of equation (15).
Figure 10:
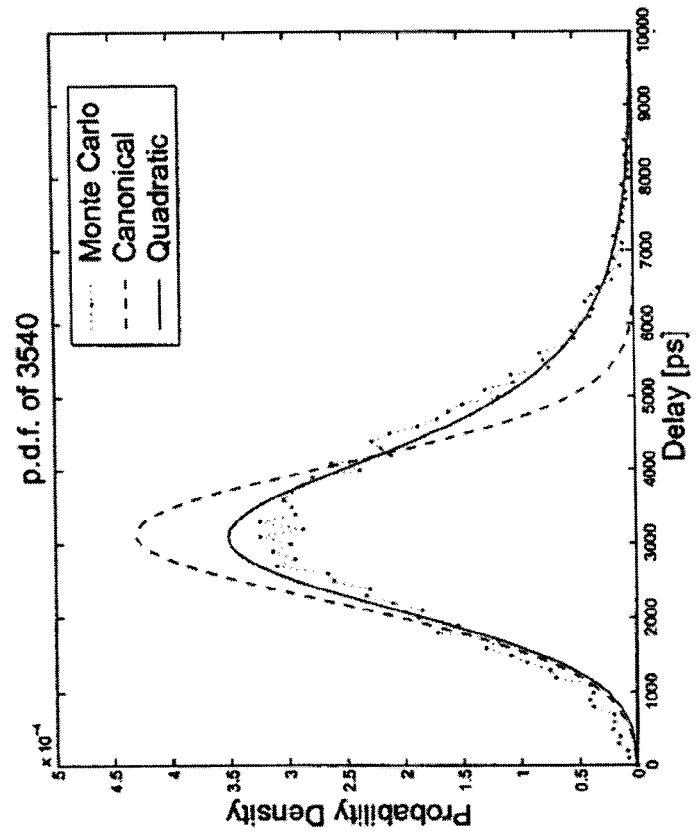

FIG. 10 graphically illustrates the accuracy improvement achieved by the quadratic model for ISCAS circuit c3540. It is seen that the accuracy improvement of the quadratic model mostly arises from the high probability region of the distribution, which is actually more critical for circuit performance. The first-order canonical model will clearly underestimate the delay in the high probability region, resulting in optimistic design and excessive chip failure.

TABLE 2 shows the CPU time for the three approaches. While the quadratic method incurs several times the run time of the first order canonical model, the overall run time is still extremely reasonable for a circuit with thousands of gates, in effect providing a significant accuracy improvement with a relatively small run time penalty. TABLE 2 also lists the size of the MAX tuple at the sink node and the average tuple size of the circuit. The small tuple size shows that the MAX operation behaves linearly at most times during the timing analysis, and can be safely approximated by a linear operator.

TABLE 2

| Name | c432 | c880 | c1335 | c1908 | c2670 | c3540 | c6288 | c7552 |
|---|---|---|---|---|---|---|---|---|
| Gate Counts | 280 | 641 | 717 | 1188 | 2004 | 2485 | 2704 | 5355 |
| Grid Cells | 3 × 3 | 5 × 3 | 5 × 4 | 5 × 4 | 6 × 5 | 7 × 6 | 12 × 10 | 10 × 8 |
| Quadratic | 0.36 s | 0.52 s | 0.81 s | 0.63 s | 0.83 s | 1.32 s | 7.23 s | 4.32 s |
| Canonical | 0.07 s | 0.18 s | 0.25 s | 0.18 s | 0.23 s | 0.61 s | 4.20 s | 1.98 s |
| CPU Penalty | 5.1× | 2.9× | 3.2× | 3.5× | 3.6× | 2.2× | 1.7× | 2.2× |
| Sink Tuple Size | 1 | 8 | 1 | 2 | 2 | 4 | 3 | 4 |

TABLE 2-continued

| | | | | | | | | |
|---|---|---|---|---|---|---|---|---|
| Average Tuple Size | 1.2 | 1.2 | 1.5 | 1.3 | 1.2 | 1.3 | 1.1 | 1.3 |

The invention is not intended to be limited to the preferred methods and steps described above, but rather is intended to be limited only by the claims set out below. Thus, the invention encompasses all different versions that fall literally or equivalently within the scope of these claims. It should also be understood that in these claims, where symbols and formulae are expressed, the claims are not to be interpreted as meaning that the invention is limited to these symbols and formulae. Rather, the claims extend to processes utilizing the relations set forth by the formulae, regardless of whether the same characters/symbology are used, and regardless of whether the formulae are expressed in the form set forth in the claims or in a different format.

What is claimed is:

1. A method for predicting the signal delay in a circuit having circuit paths formed by elements connected by interconnects wherein:
   (1) at least some of the circuit paths intersect;
   (2) all elements and interconnects each:
      (a) have an associated signal delay D, and
      (b) have at least one of:
   (i) an adjacent upstream element or interconnect from which a signal delay is propagated, and
   (ii) an adjacent downstream element or interconnect to which the signal delay D is propagated;
   (3) at least one set of correlated signal delays is present, wherein at least one of the signal delays $D_X$ therein is correlated with at least one of the other signal delays $D_Y$ therein such that $cov(D_X, D_Y)$ is nonzero, and
   (4) one or more sets of correlated signal delays arise from global variations, the method comprising the following steps at any path intersection wherein at least two circuit paths intersect, with a first circuit path having a signal delay $D_1$ and a second circuit path having a signal delay $D_2$:
   a. modeling each signal delay D by a function dependent on $$\sum_{i=1}^{M}\sum_{k=1}^{M} \Gamma_{i,k} G_i G_k$$

wherein:
   M is the number of global variations in the circuit;
   $G_i$ and $G_k$ are each a global variation reflecting the uncertainty in the value of D, each such uncertainty being shared by the element and one or more other elements in the circuit; and
   $\Gamma_{i,k}$ is a global sensitivity coefficient reflecting the dependence of D on both of global variations $G_i$ and $G_k$ in the circuit;
   b. evaluating using a computer the gaussianity of the function $MAX(D_1, D_2)$;
   c. if the gaussianity does not meet a threshold standard, storing signal delays $D_1$ and $D_2$ in a signal delay tuple Mt; and
   d. propagating the signal delay tuple Mt to any downstream element or interconnect using the computer.

2. The method of claim 1 wherein:
   a. the step of evaluating the gaussianity of the function $MAX(D_1, D_2)$ includes determining the skewness of the function $MAX(D_1, D_2)$; and
   b. the step of storing signal delays $D_1$ and $D_2$ in a signal delay tuple Mt is performed if the skewness of the function $MAX(D_1, D_2)$ is greater than a threshold value.

3. The method of claim 1 wherein the signal delay of any adjacent downstream element or interconnect is added to each signal delay within the signal delay tuple Mt.

4. The method of claim 1 further comprising the step, at any downstream path intersections at which the circuit path bearing the signal delay tuple Mt intersects with a circuit path bearing a signal delay $D_0$, of storing the signal delay $D_0$ in the signal delay tuple Mt.

5. The method of claim 4 further comprising the steps of:
   a. evaluating the gaussianity of the function $MAX(D_0, D_{Mt})$, wherein $D_{Mt}$ is a signal delay from within the signal delay tuple Mt;
   b. if the gaussianity meets a threshold standard, substituting $MAX(D_0, D_{Mt})$ for $D_0$ and $D_{Mt}$ within the signal delay tuple Mt.

6. The method of claim 5 wherein the step of evaluating the gaussianity of the function $MAX(D_0, D_{Mt})$ includes determining the skewness of the function $MAX(D_0, D_{Mt})$.

7. The method of claim 1 further comprising the steps, at any downstream path intersections at which the circuit path bearing the signal delay tuple intersects with a circuit path bearing a signal delay D, of:
   a. evaluating the gaussianity of the function $MAX(D_0, D_{Mt})$, wherein $D_{Mt}$ is a signal delay from within the signal delay tuple Mt;
   b. if the gaussianity meets a threshold standard, substituting $MAX(D_0, D_{Mt})$ for $D_{Mt}$ within the signal delay tuple Mt.

8. The method of claim 1 further comprising the step of performing Monte Carlo simulation on the signal delays within the signal delay tuple Mt.

9. The method of claim 1 wherein the function modeling each signal delay D is also dependent on:

$$\sum_{i=1}^{M} \beta_i G_i$$

wherein $\beta_i$ is a global sensitivity coefficient reflecting the dependence of D on global variation $G_i$ in the circuit.

10. A method for predicting the signal delay in a circuit having circuit paths formed by elements connected by interconnects wherein:
   (1) at least some of the circuit paths intersect;
   (2) all elements and interconnects each:
      (a) have an associated signal delay D, and
      (b) have at least one of:
   (i) an adjacent upstream element or interconnect from which a signal delay is propagated, and (ii) an adjacent downstream element or interconnect to which the signal delay D is propagated;

(3) at least one set of correlated signal delays is present, wherein at least one of the signal delays $D_X$ therein is correlated with at least one of the other signal delays $D_Y$ therein such that $cov(D_X, D_Y)$ is nonzero, and (4) one or more sets of correlated signal delays arise from global variations, the method comprising the following steps at any path intersection wherein at least two circuit paths intersect, with a first circuit path having a signal delay $D_1$ and a second circuit path having a signal delay $D_2$, a. evaluating using a computer the gaussianity of the function $MAX(D_1, D_2)$;

b. if the gaussianity does not meet a threshold standard, storing signal delays $D_1$ and $D_2$ in a signal delay tuple Mt; and c. propagating the signal delay tuple Mt to any downstream element or interconnect using the computer;

wherein each signal delay D is modeled by:

$$D = \mu_D + \sum_{j=1}^{N} \alpha_j R_j + \sum_{i=1}^{M} \beta_i G_i + \sum_{i=1}^{M}\sum_{k=1}^{M} \Gamma_{i,k} G_i G_k$$

wherein:

$\mu D$ is a nominal value for D;

N is the number of signal delays in the circuit;

M is the number of global variations in the circuit;

$\alpha_j$ is a node sensitivity coefficient reflecting the dependence of D on signal delay j in the circuit;

$R_j$ is a local variation reflecting the uncertainty in the value of D localized in the element;

$G_i$ and $G_k$ are each a global variation reflecting the uncertainty in the value of D, each such uncertainty being shared by the element and one or more other elements in the circuit;

$\beta_i$ is a global sensitivity coefficient reflecting the dependence of D on global variation Gi in the circuit; and $\Gamma_{i,k}$ is a global sensitivity coefficient reflecting the dependence of D on both of global variations Gi and Gk in the circuit.

11. A method for predicting the signal delay in a circuit having circuit paths formed by elements connected by interconnects wherein:

(1) at least some of the circuit paths intersect, (2) all elements and interconnects each:

(a) have an associated signal delay D, and (b) have at least one of:

(i) an adjacent upstream element or interconnect from which a signal delay is propagated, and (ii) an adjacent downstream element or interconnect to which the signal delay D is propagated;

(3) at least one set of correlated signal delays is present, wherein at least one of the signal delays $D_X$ therein is correlated with at least one of the other signal delays $D_Y$ therein such that $cov(D_X, D_Y)$ is nonzero, and (4) one or more sets of correlated signal delays arise from global variations, the method comprising the steps of:

a. modeling, using a computer, each signal delay D by:

$$D = \mu_D + \sum_{j=1}^{N} \alpha_j R_j + \sum_{i=1}^{M} \beta_i G_i + \sum_{i=1}^{M}\sum_{k=1}^{M} \Gamma_{i,k} G_i G_k$$

wherein:

$\mu D$ is a nominal value for D;

N is the number of signal delays in the circuit;

M is the number of global variations in the circuit;

$\alpha_j$ is a node sensitivity coefficient reflecting the dependence of D on signal delay j in the circuit;

$R_j$ is a local variation reflecting the uncertainty in the value of D localized in the element;

$G_i$ and $G_k$ are each a global variation reflecting the uncertainty in the value of D, each such uncertainty being shared by the element and one or more other elements in the circuit;

$\beta_i$ is a global sensitivity coefficient reflecting the dependence of D on global variation $G_i$ in the circuit; and $\Gamma_{i,k}$ is a global sensitivity coefficient reflecting the dependence of D on both of global variations $G_i$ and $G_k$ in the circuit;

b. subsequently propagating the modeled signal delays throughout at least one of the circuit paths.

12. The method of claim 11 wherein at least one of the global variations G varies in value between two locations A and B in the circuit such that $cov(G_A, G_B)$ decreases as the distance between locations A and B increases, wherein $G_A$ is the global variation at location A and $G_B$ is the global variation at location B.

13. The method of claim 11 wherein at least one of the global variations G varies in value between two locations A and B in the circuit such that $cov(G_A, G_B)$ decreases exponentially with the distance between locations A and B, wherein $G_A$ is the global variation at location A and $G_B$ is the global variation at location B.

14. The method of claim 11 wherein at least one of the global variations G varies in value between two locations A and B in the circuit such that:

$$cov(G_A, G_B) = \sigma_G^2 \exp\left(-\frac{r_{AB}}{r_c}\right)$$

wherein $G_A$ is the global variation at location A;

$G_B$ is the global variation at location B;

$\sigma_G$ is the standard deviation of the global variation G, $r_{AB}$ is the distance between locations A and B; and $R_c$ is a nonzero constant spatial correlation distance.

15. The method of claim 14 wherein:

a. the circuit is partitioned into an array of elements of at least substantially equal b. $r_{AB}$ is the distance between elements A and B; and c. $r_c$ is equal to the product of:

(1) the average size of the elements, and (2) a user-defined resolution.

16. The method of claim 11 wherein the method further comprises the following steps at any path intersection at which at least two circuit paths intersect, with a first circuit path having a signal delay $D_1$ and a second circuit path having a signal delay $D_2$:

a. evaluating the gaussianity of the function MAX($D_1$, $D_2$);
b. if the gaussianity does not meet a threshold standard, storing signal delays $D_1$ and $D_2$ in a signal delay tuple Mt; and
c. propagating the signal delay tuple Mt to any downstream element or interconnect.

17. A method for predicting the signal delay in a circuit having circuit paths formed by elements connected by interconnects wherein:
   (1) at least some of the circuit paths intersect,
   (2) all elements and interconnects each:
   (a) have an associated signal delay D, and
   (b) have at least one of:
   (i) an adjacent upstream element or interconnect from which a signal delay is propagated, and
   (ii) an adjacent downstream element or interconnect to which the signal delay D is propagated;
   (3) at least one set of correlated signal delays is present, wherein at least one of the signal delays $D_X$ therein is correlated with at least one of the other signal delays $D_Y$ therein such that cov($D_X$, $D_Y$) is nonzero, and
   (4) one or more sets of correlated signal delays arise from global variations,
the method comprising the steps of:
a. modeling, using a computer, each signal delay D by a function dependent on $$\sum_{i=1}^{M}\sum_{k=1}^{M}\Gamma_{i,k}G_iG_k$$

wherein:
M is the number of global variations in the circuit;
$G_i$ and $G_k$ are each a global variation reflecting the uncertainty in the value of D, each such uncertainty being shared by the element and one or more other elements in the circuit; and
$\Gamma_{i,k}$ is a global sensitivity coefficient reflecting the dependence of D on both of global variations $G_i$ and $G_k$ in the circuit;

b. subsequently propagating the modeled signal delays throughout at least one of the circuit paths.

18. The method of claim 17 wherein the function modeling each signal delay D is also dependent on:

$$\sum_{i=1}^{M}\beta_iG_i$$

wherein $\beta_i$ is a global sensitivity coefficient reflecting the dependence of D on global variation $G_i$ in the circuit.

19. The method of claim 18 wherein the function modeling each signal delay D is also dependent on:

$$\mu_D + \sum_{j=1}^{N}\alpha_jR_j$$

wherein: $\mu_D$ is a nominal value for D;
N is the number of signal delays in the circuit
$\alpha_j$, is a node sensitivity coefficient reflecting the dependence of D on signal delay j in the circuit; and
$R_j$ is a local variation reflecting the uncertainty in the value of D localized in the element.

20. The method of claim 17 wherein the method further comprises the following steps at any path intersection at which at least two circuit paths intersect, with a first circuit path having a signal delay $D_1$ and a second circuit path having a signal delay $D_2$:
a. evaluating the gaussianity of the function MAX($D_1$, $D_2$);
b. if the gaussianity does not meet a threshold standard, storing signal delays $D_1$ and $D_2$ in a signal delay tuple Mt; and
c. propagating the signal delay tuple Mt to any downstream element or interconnect.

* * * * *